United States Patent [19]
Kerserho

[11] 4,455,172
[45] Jun. 19, 1984

[54] WATERPROOFING COMPOSITION FOR THE BULK TREATMENT OF PLASTER OR A PLASTER-BASED PRODUCT AND CORRESPONDING METHOD

[75] Inventor: François M. Kerserho, Champigny, France

[73] Assignee: Societe pour le Developpement de la Recherche Industrielle "SODRI", Paris, France

[21] Appl. No.: 356,514

[22] Filed: Mar. 9, 1982

[30] Foreign Application Priority Data

Jun. 5, 1981 [FR] France .................... 81 11230

[51] Int. Cl.³ .................... C09K 3/10; C04B 11/00; C04B 11/22
[52] U.S. Cl. .................... 106/109; 106/33; 106/114; 106/287.13; 106/287.16
[58] Field of Search .................... 106/109, 110, 111, 33, 106/18.12, 14.44, 114, 287.13, 287.16; 252/383

[56] References Cited

U.S. PATENT DOCUMENTS

| | | | |
|---|---|---|---|
| 3,382,083 | 5/1968 | Marsden | 106/110 |
| 3,711,305 | 1/1973 | Anderson | 106/33 |
| 3,947,285 | 3/1976 | Jones et al. | 106/111 |
| 4,221,599 | 9/1980 | DeLeuil | 106/111 |
| 4,304,805 | 12/1981 | Packo et al. | 106/33 |

FOREIGN PATENT DOCUMENTS

| | | | |
|---|---|---|---|
| 2307422 | 8/1973 | Fed. Rep. of Germany | 106/33 |
| 55-130848 | 11/1980 | Japan | 106/109 |
| WO81/10702 | 6/1981 | PCT Int'l Appl. | 106/111 |

*Primary Examiner*—Gary P. Straub
*Attorney, Agent, or Firm*—Brisebois & Kruger

[57] ABSTRACT

A waterproofing composition for incorporation in the mixing water of plaster or a plaster-based product, comprises, in an aqueous medium, at least one monomer silane which upon hydrolysis forms a silicone resin, said monomer silane having the general formula $R_xSi(OR')_n$, in which formula R and R' are independently a lower alkyl radical having 1 to 4 carbon atoms or a phenyl radical, and in which x and n are integers or x is zero, the sum of x and n being 4, said composition also containing a dispersion of at least one insoluble fatty acid salt.

10 Claims, No Drawings

WATERPROOFING COMPOSITION FOR THE BULK TREATMENT OF PLASTER OR A PLASTER-BASED PRODUCT AND CORRESPONDING METHOD

BACKGROUND OF THE INVENTION

It is known that it is often desirable to treat plaster in bulk before use or to treat a plaster-based product such as plaster-fibreboard before manufacture, in order to protect the finished material against water penetration resulting, for example, from water seeping up from the ground. A bulk treatment of this type takes place by adding a waterproofing composition to the mixing or guaging water when the plaster is manufactured.

Potassium or sodium siliconates may be mentioned among waterproofing substances which have already been used. As a result of their alkalinity, these products have the disadvantage that they produce surface effloresence, or even pits, owing to the presence of soluble carbonates. Attempts have also been made to use powdered silicone resins but they are difficult to use owing to the fact that the difference in density of the powders may range from 1 to 3 and also to the fact that powdered cross-linking agents or catalysts have to be used. Different types of aqueous emulsions of silicones have also been used; but in this case the rate of waterproofing for a reasonable consumption of emulsion is inadequate and, in addition, the amount of water absorbed remains relatively large (of the order between 5 and 7%, whereas it varies between 15 and 20% for non-waterproofed plaster).

It has also very recently been considered to use silanes in appropriate forms which are incorporated in the mixing of the plaster. After hydrolysis the silanes lead to the formation in situ of a silicone-type of resin. At present there are several impediments preventing the generalized use of silanes as a waterproofing product. In practice the silanes are in the form of a volatile and toxic liquid which is effectively not soluble or dispersible in water; they cannot therefore be used separately but only in conjunction with other constitutents which permit their use. In addition silanes are relatively expensive and thus they should be used in the optimum manner, avoiding as far as possible their loss by evaporation and facilitating their contact with the mixing water.

In French Patent Application No. 80 26515 filed on Dec. 12, 1980, it is proposed to use a silane with a tertiary solvent for rendering the silane soluble in water. Owing to the tertiary solvent, good contact results between the mixing water and the small amount of silane added thereto, whereby efficient waterproofing of the plaster or the plaster-based product is obtained. Nevertheless, in the finished material, the tertiary solvent, which is an alcohol with a low molecular weight, such as methanol or ethanol, or a ketone, such as acetone, tends to evaporate and entrain the silane, which results in a non-negligible loss of silane, taking into account its high cost.

In order to facilitate hydrolysis of the silane in an aqueous medium and to ensure at the same time a good dispersion of the silicone resin formed inside the plaster or plaster-based product, it is also proposed in the above-mentioned French application to add to the mixing water a slightly acid acidification agent, such as acidic calcium mono- or di-phosphate. Although this acid agent does, however, assist the hydrolysis of the silane it has the disadvantage that it retards the setting of the plaster, whereas in many cases it is advantageous to accelerate this setting process.

OBJECTS OF THE INVENTION

The object of the present invention is to propose a composition intended to be mixed with the mixing water of the plaster, which composition enables optimum use of the silane which it contains by substantially reducing the losses of silane by evaporation during setting and drying of the plaster. The composition can be used with plaster intended for end use as plaster or with plaster intended for use in manufacture of plaster products such as boards. A further object of the invention is to carry out with small amounts of silane the efficient waterproofing of the set plaster or the plaster-based product, the moisture absorption rate after waterproofing in this manner being substantially lower than that which is usually obtained with conventional waterproofing compositions.

SUMMARY OF INVENTION

Thus the present invention is an improvement in a waterproofing composition to be incorporated in the mixing water of a plaster or plaster-based product, said composition comprising in an aqueous medium at least one monomer silane which, after hydrolysis, leads to the formation of a silicone type of resin and complying with the following formula: $R_x-Si-(OR')_n$, in which formula R and R' are independently a lower alkyl radical having between 1 and 4 carbon atoms or a phenyl radical and in which x and n are integers, the sum of which is 4 and x may be zero. In accordance with the invention, the composition comprises a dispersion of at least one water-insoluble fatty acid salt.

The present invention also provides a method for bulk waterproofing of plaster or a plaster-based product, characterized in that there is added to the mixing water of the plaster or plaster-based product between approximately 2 and approximately 10% of the composition of the invention, the percentages being expressed by weight with respect to the weight of the plaster or the plaster-based product.

The waterproofing composition according to the invention may be prepared by dispersing the insoluble fatty acid salt in the water, whilst stirring vigorously, and subsequently adding the silane which apparently attaches itself to or is adsorbed on the fatty acid salt particles dispersed in the water.

DESCRIPTION OF PREFERRED EMBODIMENTS

Insoluble fatty acid salts which may be used in the invention include stearates and oleates, such as magnesium oleate and magnesium, aluminum or calcium stearate. It is preferable to use stearates such as calcium stearate owing to the fact that they are readily available and that their manufacturing price is low.

The insoluble fatty acid salt content of the waterproofing composition is advantageously between 10 and 20% by weight in relation to the total weight of the composition.

The insoluble fatty acid salt used in the composition according to the invention is advantageous for several reasons:

it adsorbs the silane in an aqueous medium;
it prepares and assists cross-linking of the said silane: to this end it acts as the acidification agent used in the French Patent Application No. 80 26515, without having a retarding effect on the setting of the plaster;

it has per se waterproofing properties which combine with the waterproofing properties of the silane;

it is a thickener and plastifier not only for the formula according to the invention, when it has the consistency of paste, but also of the finished plaster when it has been cast and dried; it is noted that incorporating the dispersion of an insoluble fatty acid salt or insoluble fatty acid salts, in particular calciuim stearate, in the mixing water of the plaster provides the finished product with a brighter and more flexible appearance owing to the presence of the stearate.

The composition according to the invention advantageously comprises between 0.5% and 5%, preferably between 1 and 2%, silane, these percentages being expressed by weight in relation to the total weight of the composition.

In a first embodiment, the composition according to the invention may comprise, as described in the French Patent Application No. 80 26515, a tertiary solvent used to render the silane soluble in water and selected from the group comprising methanol, ethanol, propanol, isopropanol, ketones and dimethylsuphoxide. In a second embodiment, which is particularly preferable, the composition according to the invention comprises, in a manner known per se, a silicone resin, in particular methylsilicone, in addition to the silane.

In a particuarly advantageous embodiment, the composition according to the invention comprises at least one thickening agent. Suitable agents can be selected from the group comprising silica, bentonite, alginates such as sodium alginate, cellulose derivatives such as methylcellulose or hydroxyethylcellulose, or their mixtures. The incorporation of a thickening agent not only enables the consistency of the waterproofing composition to be controlled in order to provide it in particular with the appearance of a paste, but also has the effect of fixing the silane inside the composition such that it is thus prevented from evaporating.

The content of thicknening agent or agents is generally between 0.5 and 2% by weight with respect to the total weight of the composition. The percentages are not critical and it is possible to use a proportion of thickening agent which is smaller or greater than the range of weights given above.

According to a further feature of the waterproofing composition according to the invention, the composition comprises an amount of dissolved plaster between 1 and 5% by weight with respect to the total weight of the composition. The presence of the dissolved plaster has three advantages: firstly, it acts as the thickener; secondly, it accelerates setting very well and it has the advantage, with respect to other setting accelerating agents that it has a low manufacturing cost; finally, it does not have any secondary effect in the finished plaster or plaster-based product.

The composition according to the invention may be of low consistency and have the appearance of milk or it may be very consistent and have the appearance of a malleable paste. Generally its water content is between 60 and 90% by weight with respect to the total weight of the composition. In all cases the composition according to the invention may be easily mixed, even if it is only stirred slightly, with the mixing water of plaster or the plaster-based product.

EXAMPLES OF THE INVENTION

Further advantages and features of the invention will be shown in the following description which is given by way of non-limiting example.

EXAMPLE 1

The following constituents were mixed with vigorous stirring (the percentages being expressed by weight with respect to the total weight of the composition): calcium sterarate: 20%, methylcellulose: 1%, silane corresponding to the formula $CH_3Si(OCH_3)_3$ (molecular weight 136; purity approximately 95% density 0.9): 5%, dissolved plaster: 2%, bentonite: 2%, water: 70%.

The mixture was produced by adding last the silane; vigorous stirring was continued until a plastic and homogeneous paste was obtained which could easily be dissolved in the plaster mixing water.

In this example the above waterproofing paste was used in a proportion of approximately 2% by weight with respect to the plaster to be mixed. When the plaster had been mixed and cast it was allowed to set.

It was noted that the waterproofed plaster absorbed less than 0.5% water whereas a control plaster prepared in identical conditions absorbed approximately 20% water.

EXAMPLE 2

The following constituents were mixed with vigorous stirring (the percentages being expressed by weight with respect to the total weight of the composition): aluminum stearate: 15%, plaster: 2%, silica: 2%, aluminum alginate: 5%, methylsilicone: 1%, silane corresponding to the formula $CH_3Si(OCH_3)_3$ (molecular weight 136; purity approximately 95%; density 0.9): 4%, water: 71%.

As in Example 1, the silane was added last; the vigorous stirring was continued until a plastic and homogeneous paste was obtained which could be easily dissolved in the plaster mixing water.

The above waterproofing paste was used in a proportion of approximately 2% by weight with respect to the plaster to be mixed. When the plaster had been mixed and cast it was allowed to set. The amount of water absorbed by the waterproofed plaster was less than 0.5%.

It is understood that the embodiments described above are in no way limiting and may include any modifications desired without departing from the scope of the invention.

I claim:

1. A water proofing composition for incorporation in the mixing water of plaster or a plaster-base product, said composition comprising the composition formed by mixing together:

about 0.5 to about 5% by weight of at least one silane of the general formula $R_xSi(OR')_n$, in which formula R and R' are independently a lower alkyl radical having 1 to 4 carbon atoms or a phenyl radical, in which x and n are integers or x is zero, the sum of x and n about 10% to about 20% by weight of a fatty acid salt which forms a dispersion, and about 60% to about 90% water.

2. Water proofing composition according to claim 1, wherein the silane has the formula $CH_3Si(OCH_3)_3$.

3. Composition according to claim 1 wherein the amount of said silane is 1% to 2%.

4. Composition according to claim 1 wherein the insoluble fatty acid salt is selected from the group consisting of stearates and oleates.

5. Composition according to claim 4 wherein the insoluble fatty acid salt is calcium or aluminum stearate.

6. Composition according to claim 1 containing a solvent selected from the group consisting of methanol, ethanol, propanol, isopropanol, ketones and dimethylsulfoxide, in a sufficient quantity to make the silane soluble in the water.

7. Composition according to claim 1 wherein a methylsilicone resin is added to the composition.

8. Composition according to claim 1 containing approximately 0.5 to approximately 2% by weight of at least one thickening agent selected from the group consisting of silica, bentonite, alginates, derivatives of cellulose or mixtures thereof.

9. Composition according to claim 1 also containing about 1% to about 5% by weight of plaster.

10. A process of waterproofing plaster or a plaster-base product comprising mixing about 2% to 10% of the composition of claim 1 in the mixing water for the plaster, and mixing the water with the plaster.

* * * * *